United States Patent [19]

Kliatzkin et al.

[11] Patent Number: 4,547,124
[45] Date of Patent: Oct. 15, 1985

[54] IMPELLER FOR A WIND MOTOR

[76] Inventors: Vladimir Kliatzkin, 1 Rav Joseph Mashash St., Kiryat-Yam; Joseph Krimerman, 22 Keren Hayessod St., Haifa; Eliezer Mayraz, 3, Dafna St., Haifa 34371, all of Israel

[21] Appl. No.: 483,899

[22] Filed: Apr. 11, 1983

[30] Foreign Application Priority Data

Apr. 11, 1982 [IL] Israel .................................. 65465

[51] Int. Cl.$^4$ ............................................. F03D 1/06
[52] U.S. Cl. ...................................... 416/86; 416/84; 416/132 B; 416/189
[58] Field of Search ........... 416/189 A, 196 A, 84–86, 416/11, 142 B, 132 B

[56] References Cited

U.S. PATENT DOCUMENTS

| 543,461 | 7/1895 | Bramwell | 416/196 A |
|---|---|---|---|
| 1,360,596 | 11/1920 | St. John | 416/84 |
| 1,707,235 | 4/1929 | Sargent | 416/11 |
| 2,616,509 | 11/1952 | Thomas | 416/84 |
| 3,384,183 | 5/1968 | Braverman | 416/84 |
| 3,743,440 | 7/1973 | Moore | 416/84 |
| 3,957,232 | 5/1976 | Sebrell | 416/84 X |
| 4,073,516 | 2/1978 | Kling | 416/126 X |
| 4,083,652 | 4/1978 | Isaacson | 416/84 |
| 4,084,102 | 4/1978 | Fry et al. | 416/85 X |
| 4,124,182 | 11/1978 | Loeb | 416/84 X |
| 4,159,191 | 6/1979 | Graybill | 416/11 |
| 4,166,596 | 9/1979 | Mouton et al. | 416/85 X |
| 4,207,026 | 6/1980 | Kushto | 416/86 X |
| 4,309,006 | 1/1982 | Biscomb | 416/85 X |
| 4,390,148 | 6/1983 | Cudmore | 416/11 |

FOREIGN PATENT DOCUMENTS

| 9665 | 8/1880 | Fed. Rep. of Germany | 416/84 |
|---|---|---|---|
| 804090 | 4/1951 | Fed. Rep. of Germany | 416/189 A |
| 2949057 | 6/1981 | Fed. Rep. of Germany | 416/189 A |
| 3004910 | 8/1981 | Fed. Rep. of Germany | 416/84 |
| 827487 | 4/1938 | France | 416/11 |
| 1037243 | 9/1953 | France | 416/132 B |
| 2247922 | 5/1975 | France | 416/85 |
| 8290 | of 1910 | United Kingdom | 416/84 |
| 166460 | 7/1921 | United Kingdom | 416/84 |

Primary Examiner—Everette A. Powell, Jr.
Attorney, Agent, or Firm—Fleit, Jacobson, Cohn & Price

[57] ABSTRACT

An impeller for a windmotor consists of a rigid hub attached to a rotatingly mounted shaft, an outer rim concentric with the hub and a number of radial vanes of a flexible material, such as fabric, stretched between the hub and the rim, whereby their angle of inclination decreases from their inner to their outer ends. The rim is likewise made of a flexible, non-permeable fabric or other material in the shape of a hollow torus, which is filled with a gas at a pressure sufficient to maintain the shape of the torus under the stresses of wind and other forces. The torus may be filled with hydrogen or helium, whereby the entire impeller becomes lighter than air, thus eliminating the weight factor with regard to impellers with very large diameters.

11 Claims, 8 Drawing Figures

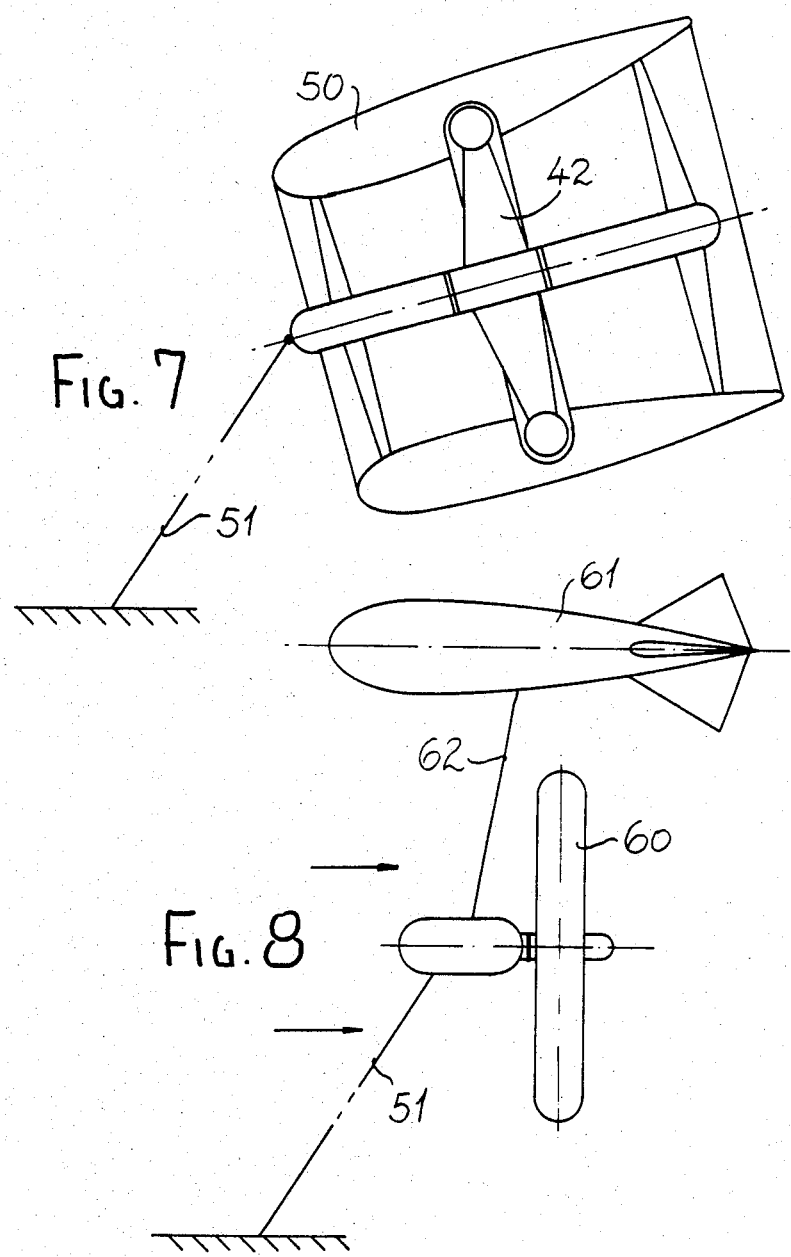

IMPELLER FOR A WIND MOTOR

FIELD OF INVENTION

The invention relates to a rotor to be used either as a wind motor adapted to generate power, or as a propeller driven by a power source and adapted to propel missiles and aircraft.

BACKGROUND OF THE INVENTION

In view of the high cost of fossil fuel there has lately been great activity in the development of wind motors for generation of power, and many designs of runners have become available. Use of wind power is not new, in fact, windmills were used hundreds of years ago for milling corn or for raising water, their impellers usually consisting of radial struts to which sails or wooden lath construction are attached. This type of wind motor was replaced, in the last century by multi-vane runners which comprise a plurality of radial, inclined vanes fastened between an outer and an inner ring, the latter ring being mounted on a horizontal or slightly inclined shaft. The multi-vane runner has lately been further developed, resulting in a rotor wherein all elements work under stress, this embodiment being known as the CHALK TURBINE. Herein hollow vanes are radially positioned between two concentric rings, with tension wires stretched inside the vanes and connecting the two rings under tension. In spite of their other advantages, multi-vane impellers show a relatively low aerodynamic efficiency and are, therefore, used for only relatively small outputs.

The windmill-type runner, on the other hand, has given way to a rotor provided with two to six aerodynamically shaped, generally hollow, blades which are being built to considerable diameters and large output at high efficiency, and which form one of the main points of today's development.

The main drawback of the existing windmotors is their stiff and rigid construction which makes them liable to damage at high wind velocities, and requires special means for turning them out of the wind direction during storms and heavy squalls, in order to prevent breakdown of the installation. These precautionary measures comprise either means for turning the turbine shaft perpendicular to the wind direction as soon as the wind reaches a dangerous speed, or means for altering the inclination of each individual blade in accordance with wind velocity. Another drawback of the rigid construction is the increase in weight with increasing diameter of the rotor which limits the wind motor capacity on the one hand, and makes requirement for very strong support structures, on the other; both result in high specific cost per kw produced.

It is, therefore, the main object of the invention to provide a rotor or impeller of light weight which lends itself to be built to very large diameters. It is another object to provide a resilient and flexible impeller, thus preventing any danger of damage by high wind velocities, and it is still another object to provide such impeller with built-in, integral braking means so as to limit its revolutions to a safe margin of stress of the material.

A further object, actually resulting from the previous demands, is to permit the installation of such lightweight at great heights, so as to utilize the higher wind velocities occurring in these zones.

SUMMARY OF INVENTION

An impeller for a wind motor, according to the invention, consists of a rigid hub rigidly attached to a rotatingly mounted shaft, a rigid outer rim concentric with the hub and the shaft and distanced therefrom, and radial vanes of a flexible material stretchedly positioned in the annular space between the hub and the rim and attached by their inner ends to the outside of the hub, and by their outer ends to the inside of the rim, in such a manner that the angle of inclination of each vane decreases from its inner to its outer end.

The outer rim may consist of a rigid, solid material, but is preferably in the shape of a hollow torus of circular cross section fabricated from a non-permeable, flexible material which is filled with a gas at a pressure sufficient to maintain the shape of the torus under the stresses of wind and other forces.

As another means of maintaining the shape of the rim the torus may be filled with a light, porous material such as polyurethane. It will be understood that the cross section of the torus, in this case, need not be circular, but may be elliptical or in the shape of an aerodynamic profile.

The impeller is either mounted direct on the shaft of an electric generator thus forming a compact unit, or it is connected to a spaced-apart generator or another machine by transmission means. The wind motor is generally mounted on a vertical pivot on top of a high structure, means being provided to turn it facing into the wind direction, as known to the art.

Power is carried to the ground by electrical cables in the case of the compact generating unit, or by known mechanical or hydraulic transmission means provided between the rotor shaft and the generator erected at the base of the structure.

The design of the impeller permits its positioning high above ground, up to 12,000 m, where high wind velocities prevail most of the time. This can be carried out by increasing the volume of the torus to a predetermined value, i.e. increasing its cross section, and filling the torus with a light gas, such as helium or hydrogen, thus making the unit sufficiently light to be carried by a balloon, or making it self-floating, i.e. providing a compact unit composed of a generator, impeller and carrying structure with sufficient buoyancy to float in the air and being anchored to the ground by cables.

The vanes may be either in the form of sails made of a single layer of sail cloth or plastic cloth, or they may be hollow, made of two layers, and have an aerodynamic cross section. This section can be maintained by means of light, spaced-apart frames, or by means of gas-filled tubes of the same material radially positioned inside the vane section.

The ends of the vanes are preferably attached to the hub and the rim by means of light metal angles curved according to the required profile. In order to provide the required radial tension, the length of the vanes is made somewhat shorter than the final distance between hub and rim, and the vanes are attached to the above angles by known connecting means, prior to the inflation of the torus. The torus, under full pressure, will expand and thus stretch the vanes and pre-tension them.

Wind acting on the impeller will rotate the entire impeller including the torus. It is well understood that the torus presents a resistance against rotation and that, therefore, the total efficiency of the wind motor will be lower than that of the conventional impeller with the same number of rigid blades and the same relative speed. However, the light weight and the constructional details permit the impeller to be made to a much larger diameter than the existing wind motors, without danger of breakage. This, together with the fact that the cost of the impeller is considerably less than that of a rigid runner will make its use in generating electricity worthwhile, and it can be expected that the price of electric power will be much lower than that generated by burning fossil fuel.

It has been calculated that the a self-floating windmotor built to a diameter of 150 m and raised to a height of 12,000 m, can generate up to $2.9 \times 10^9$ kwh per year at the prevailing wind velocities at that height.

An advantage of the rotating torus lies in its resistance to its rotation at higher wind velocities which prevents the rotor from reaching excessive rotational speed. Owing to the pressure exerted on the vanes and the torus, the latter will be driven to the rear of the hub by a distance depending on the wind velocity and will thereby stretch and reinforce the vanes, without being, itself, deformed by the stresses.

A further advantage of the flexible vanes is that the noise level produced by the impeller is much lower than the noise level of impellers provided with rigid blades, more especially since the blade tips are shrouded by the torus.

BRIEF DESCRIPTION OF THE DRAWINGS

The foregoing objects and other advantages of the invention will become apparent from the following description and claims and the accompanying drawings, wherein FIG. 7 is section through an inflatable free-floating housing of a wind motor containing an impeller and a generator, and FIG. 8 is a diagrammatical view of a wind motor carried by a lighter-than-air balloon and anchored to the ground by an electric transmission cable.

DESCRIPTION OF PREFERRED EMBODIMENTS

Figure 1:
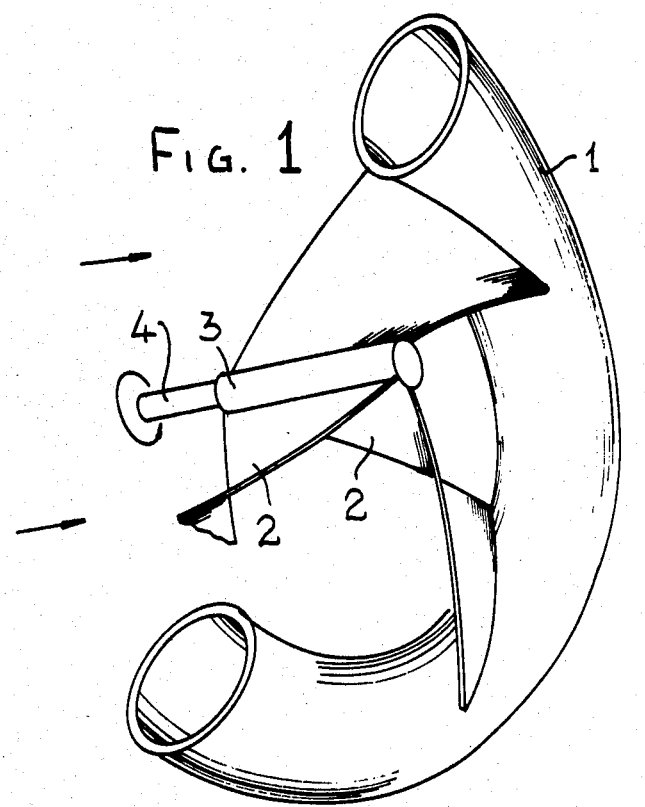
FIG. 1 is an isometric view and part section of a wind motor impeller comprising a rim in the shape of an inflatable torus and four flexible vanes.
Figure 2:
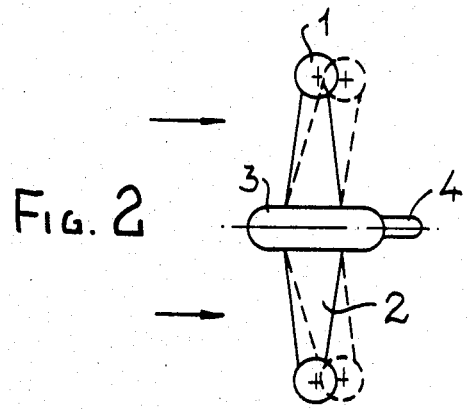
FIG. 2 is a cross section of an impeller showing the action of wind force on the configuration of the impeller and the position of the vanes.

With reference to FIGS. 1 and 2 which show an impeller in a diagrammatical manner, the impeller comprises a rim in the shape of a hollow torus 1 of circular cross section which is made of a flexible, impermeable material and is filled with air or a gas lighter than air, at a pressure higher than the surrounding atmosphere, which causes the torus to be inflated into a semi-rigid body of sufficient strength to withstand the forus of the vanes acting thereon. Four vanes 2 made of a flexible cloth or plastic are attached along four equidistant curved lines on the inside of the torus at their one end, while their other ends are attached, along parallel lines, to a hub 3 which is coaxially attached to a wind motor shaft 4.

The impeller is positioned so as to face the wind direction by means known to the art, and the flexible vanes give way as shown in FIG. 2, proportionally to the wind velocity acting on the vanes in the direction of the arrows. The rim or torus 1 is dislocated from its original position in the plane of the hub, as shown in full lines, to a position behind the hub as shown in broken lines. The vanes, in addition to being bent in rearward direction, also adapt their curvature to the wind forces as far as their tension permits. As mentioned before, the torus exerts a certain braking force on the revolutions due to friction of the body rotating in air, but this is an advantage at high winds, since it prevents the impeller from attaining excessive rotational speed.

Figure 3:
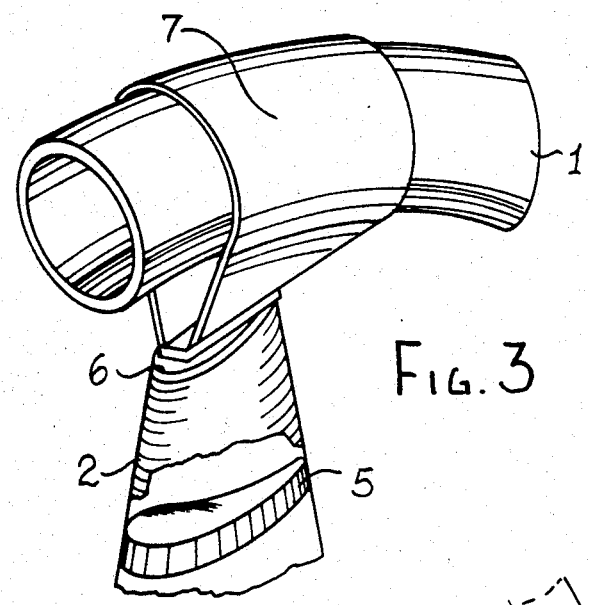
FIG. 3 is an isometric view of one kind of connection between a vane and an inflated torus-shaped rim of an impeller.

FIG. 3 illustrates one manner of attachment of a vane 2 to the torus-shaped rim 1 of the impeller. The vane 2, in the present case, is hollow and is formed in the shape of an aerodynamic profile which is maintained in shape by a number of spaced-apart frames 5 (one frame being shown only), and one end plate 6 close to the rim 1. This plate 6 is connected to a sleeve 7 which surrounds the rim, four sleeves being required in the case of four vanes; the sleeve is provided with means permitting its being shortened so as to tension the vanes without, however, deforming the rim by excessive centripetal pull.

Figure 4:
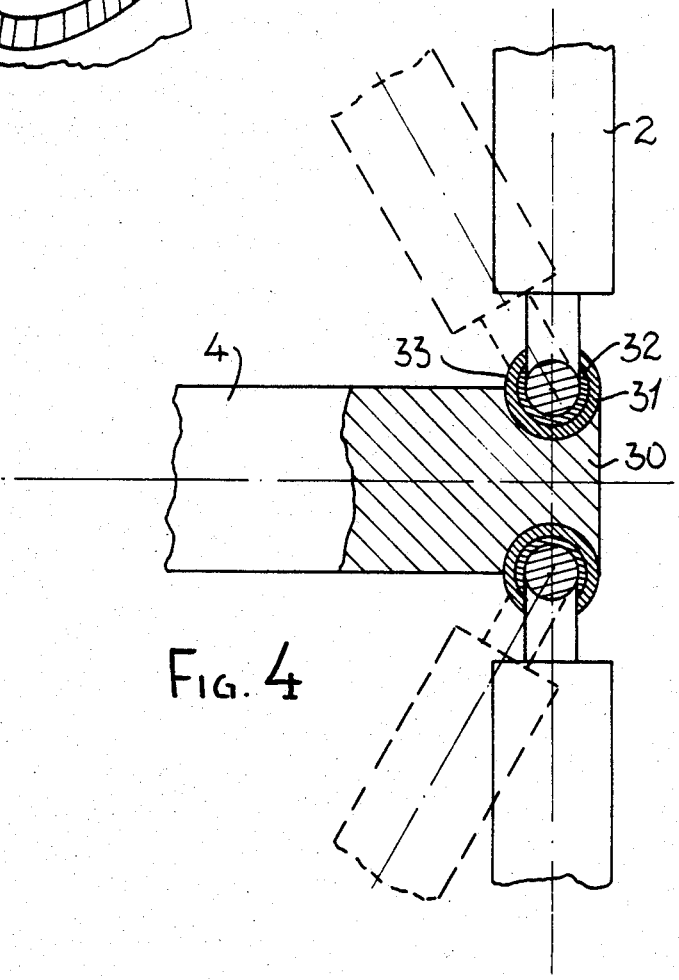
FIG. 4 shows a hub of an impeller with pivotally attached flexible vanes.

One way of connecting the vanes to a hub is shown in FIG. 4, wherein the hub is in the shape of a bulb 30 at the end of the shaft 4; this bulb is recessed by radial cuts 31, four cuts being provided for attachment of four vanes, each cut being traversed by a pin 32. The inner ends of the vanes 2 are extended in the shape of perforated lugs 33 which are mounted on the pins 32 and held in position, while their other ends are attached to the rim and stretched between their points of attachment.

FIG. 4 shows that the vanes can be tilted about the pins 32 until they reach the position shown in broken lines, but it will be understood that the shown angle is exaggerated and will not be reached during actual operation.

Figure 5:
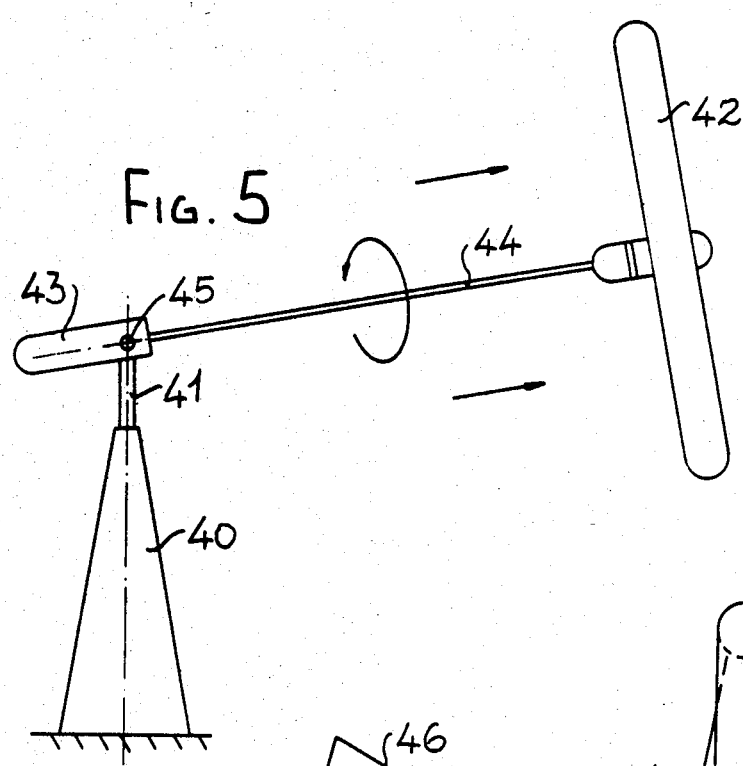
FIG. 5 is an elevation of a tower and mounted thereon a wind motor comprising a generator and an impeller connected by a flexible power transmission cable.
Figure 6:
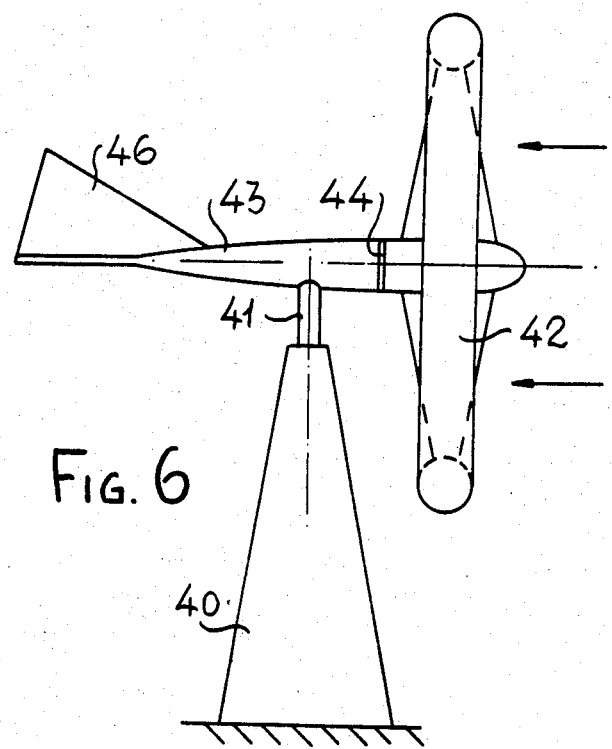
FIG. 6 is an elevation of a tower and mounted thereon an impeller and generator in a conventional manner.

FIGS. 5 and 6 illustrate two ways of mounting a wind motor of the kind referred to, on a high tower 40. The unit is rotatable about a vertical pivot 41 which permits the impeller to fully face the wind direction. The torus of the impeller 42 of FIG. 5 is filled with a light gas which makes the impeller-free-floating in the air, and the impeller is connected to a generator 43 by a torque-transmitting cable 44. The generator is, in addition to being horizontally rotatable about the vertical pivot 41, also tiltable in vertical direction about a horizontal pivot 45. This permits the impeller to adjust itself to the direction of the wind in both horizontal and vertical direction.

FIG. 6 illustrates a similar arrangement, but in a more conventional manner, wherein a generator unit 43 is coaxially connected to an impeller 42 by means of a shaft 44'. The unit is veered into the wind by a vane 46 positioned at the rear end of the unit.

FIG. 7 shows a method of mounting a wind motor hhigh above ground, with a view of utilizing the high wind velocities prevailing at great heights. The wind motor unit is mounted inside an annular hollow housing 50 preferably made of a flexible, light and impermeable material and filled with helium of hydrogen. The housing will carry the entire structure to great heights, and since it is anchored to the ground by a cable 51 attached at its upstream end, it will automatically take up its correct position in the direction of the wind vector. The cable 51 which is also used to transmit electricity generated by the generator to the ground, may be replaced by a torque-transmitting cable adapted to transmit the rotations of the impeller to a generator positioned on the ground.

A similar, more conventional arrangement is shown by FIG. 8 wherein a wind motor unit 60 is raised to great heights by a balloon 61, from which the unit is suspended by means of a cable 62. The unit itself is anchored to the ground by a cable 51 adapted to transmit generated electricity.

The aforedescribed embodiments of the wind motor and electricity-generating set represent only examples of the various embodiments made possible by using the flexible, ligh-weight impeller, in different combinations.

The impeller itself may be modified, within the spirit of the invention, by a person skilled in the art, as for instance, in the following variations: Instead of a hollow torus the rim may consists of a circular flat hoop made of a light metal. Evidently, this impeller must be firmly positioned on a tower, for instance in the manner as shown in FIG. 6, since it is heavier than air, or it may be used in the arrangement shown in FIGS. 7 and 8, where the buoyancy of the rim is of no great influence.

The connection of the vanes to the torus may also be by means of curved metal profiles attached to the torus and/or the vanes by epoxy adhesives, or in any other manner.

Since high-speed generators are of smaller size and less weight than low speed generators, and since the large-diameter impellers obviously run at low speed, it will, in many cases, be necessary to instal a speed increasing gear between impeller and generator. This will be very important in all cases where the weight of a wind motor unit has to be carried aloft, either by balloon means or by a lighter-than-air casing.

In order to balance the angular momentum on the tower or other carrying structure, it is proposed—as known to the art—to provide a tandem arrangement of two impellers rotating in opposite sense of direction.

It is also proposed to use an impeller of similar design as a propeller, and it may be of use in the case of fans or blowers where high efficiency is not imperative, or in connection with certain aircraft.

We claim:

1. An impeller for a wind motor, said impeller comprising:
    a rigid hub attached to a rotatably mounted shaft of a wind motor,
    a hollow inflatable outer rim in the shape of a torus and made from a flexible, non-permeable material,
    vanes extending radially from the rigid hub to the hollow inflatable outer rim, said vanes being made of a flexible material and the inner end of each vane being connected to said rigid hub and the outer end of each vane being connected to said hollow inflatable outer rim, said vanes being bent in a rearward direction when subjected to wind forces,
    means for maintaining the torus shape of the hollow inflatable rim when the hollow inflatable outer rim is under the stress of wind forces for stretching and pretensioning said vanes to concentrically position the hollow inflatable outer rim around said rigid hub, and
    said hollow inflatable outer rim brakes its speed of revolution to a safe margin of stress when said hollow inflatable outer rim is directed into the direction of the wind forces driving said hollow inflatable outer rim rearwardly of said rigid hub a distance dependent on the wind velocity to stretch and reinforce said vanes without deforming said hollow inflatable rim.

2. An impeller as claimed in claim 1, wherein the angle of inclination of each vane decreases from its inner end towards its outer end.

3. An impeller according to claim 1, wherein the vanes are made of flexible cloth or plastic sheeting.

4. An impeller according to claim 1, wherein the vanes are hollow and of aerodynamic configuration.

5. An impeller as claimed in claim 1, wherein each of the vanes include a sleeve surrounding said hollow inflatable outer rim and are connected to the outer end of each vane.

6. A wind-motor comprising an impeller as claimed in claim 1, mounted on a vertical pivot on the top of a tower, said impeller being connected to the shaft of a generator of electricity, means being provided for turning the impeller into the direction of the wind.

7. A wind-motor as claimed in claim 6, comprising a generator mounted on a vertical pivot at the top of a tower, horizontal pivot means adapted to permit inclination of said generator in a vertical plane, said impeller being filled with a lighter-than-air gas and attached to said generator shaft by means of a flexible torque transmitting cable.

8. A wind-motor comprising an impeller as claimed in claim 1, comprising a generator and impeller coupled together and mounted in an annular housing of light material, said housing being hollow and filled with a lighter-than-air gas adapted to raise said wind-motor into the air, the unit being anchored to the ground by a cable provided with means for transmitting electricity.

9. A wind-motor comprising an impeller as claimed in claim 1, comprising a generator of electricity coupled to the impeller, carried aloft by a balloon anchored to the ground.

10. An impeller as claimed in claim 1, wherein the means for maintaining the torus shape of the hollow inflatable outer rim includes a light porous material.

11. An impeller as claimed in claim 1, wherein the means for maintaining the torus shape of the hollow inflatable outer rim includes a gas lighter than air at a pressure greater than the surrounding atmosphere for inflating the hollow inflatable outer rim into a semi-rigid body of sufficient strength to withstand the forces of the vanes acting thereon.

* * * * *